United States Patent
Friedes et al.

[11] Patent Number: 6,148,071
[45] Date of Patent: Nov. 14, 2000

[54] METHOD AND APPARATUS FOR PROVIDING CALLING FEATURES INDEPENDENT OF THE NUMBERING PLAN

[75] Inventors: Albert Friedes, East Brunswick; Walter Paul Zahray, Matawan, both of N.J.

[73] Assignee: AT&T Corp., New York, N.Y.

[21] Appl. No.: 09/030,600

[22] Filed: Feb. 25, 1998

[51] Int. Cl.$^7$ .................................................. H04M 3/42
[52] U.S. Cl. .......................... 379/211; 379/220; 379/221
[58] Field of Search .................................... 379/211, 212, 379/210, 219, 220, 221, 229, 201

[56] References Cited

U.S. PATENT DOCUMENTS

| | | | |
|---|---|---|---|
| 5,311,572 | 5/1994 | Friedes et al. | 379/201 |
| 5,381,467 | 1/1995 | Rosinski et al. | 379/121 |
| 5,473,677 | 12/1995 | D'Amato et al. | 379/112 |
| 5,771,282 | 6/1998 | Friedes | 379/121 |
| 5,805,688 | 9/1998 | Gillespie et al. | 379/220 |
| 5,898,769 | 4/1999 | Furman | 379/221 |

OTHER PUBLICATIONS

Patent No. 5,381,467, filed on Oct. 30, 1992 and issued on Jan. 10, 1995 to Rosinski et al.. Class: 379/121.
Patent No. 5,473,677, filed on Jun. 23, 1993 and issued on Dec. 5, 1995 to D'Amato et al.. Class: 379/112.

*Primary Examiner*—Krista Zele
*Assistant Examiner*—Benny Q. Tieu
*Attorney, Agent, or Firm*—Robert B. Levy

[57] ABSTRACT

A telecommunications network (41) for providing telecommunication subscribers (12, 14, 16, 18, and 20) with special features independent of the subscriber's number plan includes a first switch (40$_1$) that receives an incoming call for a dialed number subscriber. For each received call, the switch launches a first query to a first data base (Segmentation Directory 54) that identifies a particular one of a plurality of special features data bases (56$_1$–56$_x$) containing call processing information for the special feature subscribed to by the subscriber. In response to the identity of the particular special features data base returned to the switch via the first query, the switch launches a second query to the identified special features data base to obtain the call processing information needed to process the call to provide the special feature. In this way, a POTS subscriber can obtain a special feature, such as time-of-day or geographic routing, for example.

15 Claims, 1 Drawing Sheet

METHOD AND APPARATUS FOR PROVIDING CALLING FEATURES INDEPENDENT OF THE NUMBERING PLAN

TECHNICAL FIELD

This invention relates to a method and apparatus for providing a subscriber of telecommunications services with various features independent of the subscriber's numbering plan.

BACKGROUND ART

Telecommunications subscribers that have special numbers (access codes) such as 500, 700, 800, 888, and 900 numbers, for example, may receive special features that are not normally offered to subscribers of Plain Old Telephony Service (POTS) that do not have such access codes. For example, subscribers of 800 or 888 numbers enable the parties dialing those numbers to enjoy such special features as toll-free calling and alternate routing, including time of day and geographic routing. Special features such as alternate routing are available to subscribers that may have other special access codes as well. Typically, telecommunication service providers, such as AT&T, offer such special features associated with a special access code by recognizing whether the access code is present in the dialed number received at an ingress switch. If the dialed number contains such an access code, then the switch suspends call processing and launches an inquiry to a data base, such as the 2NCP data base within AT&T's network, to determine the special features accorded the call.

A telephone subscriber who does not possess a special access code may want the features associated with such a code. For example, a POTS subscriber may want to obtain some or all of the features associated with a particular access code, yet not change his or her present POTS number. For example, a POTS subscriber may desire alternate routing without incurring the toll charges for incoming calls as is normally the case with 800 and 888 (hereinafter, 8YY) calls. Unfortunately, present-day telecommunication service providers do not offer many special features normally associated with special access codes to POTS subscribers.

Thus, there is a need for a technique for allowing a telecommunications service subscribers to enjoy one or more special features normally associated with a special access code without the need for subscribers to change their existing POTS number.

BRIEF SUMMARY OF THE INVENTION

Briefly, the present invention provides a technique for enabling a telecommunications subscriber to enjoy one or more special features offered in a telecommunication network, for example, alternate routing, such as time-of-day or geographic routing, independent of the numbering plan. In other words, the present invention affords the subscriber the ability to obtain such special features without the need to possess, or require callers to dial, a special access code. To afford the subscriber one or more special features, each and every call received in a telecommunication network prompts the launch of an inquiry to a first network data base, typically a Segmentation Directory (SD). The SD contains a record for each dialed number subscriber receiving special services as well as the identity of one of a plurality of special features data base(s) containing instructions for providing the service subscribed to by each such dialed number subscriber. If the dialed number subscriber has pre-subscribed to a special feature, then a special features data base, containing call processing instructions for such special feature, is queried to facilitate processing of the call so the call enjoys the special feature. In some instances, more than one special features data base is queried if the call is to enjoy more than one special feature.

The inquiry to the SD upon receipt of a call within the telephone network may occur either in connection with local or inter-exchange service. For example, the receipt of a call at a local ingress switched prompt an inquiry to the SD to identify the special features data base containing the necessary call processing information to process the call to provide the desired special feature. The receipt of the call at the ingress switch of a IXC may prompt the inquiry of an SD associated with that switch. Alternately, the receipt of a call at a terminating local switch could also prompt an inquiry to an SD to identify the special features data base containing the necessary call processing information to process the call to provide the desired special feature.

In some instances, the processing of a call to a POTS dialed number to provide the call with one or more special features will depend on a precedence index value associated with a match between the dialed number and an associated dialed number in the SD and the precedence index value returned for a match between the originating number, as obtained by Automatic Number Identification (ANI), and a corresponding originating number in the SD. For example, a POTS subscriber may subscribe to a special feature, such as alternate routing. When that POTS subscriber is called by a subscriber having a special feature, such as Software Defined Network (SDN), the call is processed in accordance with the invention pursuant to the respective precedence index values returned from matching the dialed number (i.e., the POTS number) and by matching the originating number. For the above example, when the POTS subscriber subscribes to alternate routing as a special feature, the precedence index value returned for the match of the POTS dialed number will have a higher ranking than the index value associated with the match of the originating number when the originating caller subscribes to SDN service. Consequently, based on the higher ranked precedence index value, a query is first launched to special features data base containing the call processing information for the POTS dialed number to afford the alternate routing. Thereafter, a query may be launched to the special features data base for the originating number to provide the special feature(s) associated with SDN, such as sub-account billing for example, to the originating caller. Depending on the ranking of the relative precedence index values, it may be necessary to first access the special features data base associated with the originating caller to provide the originating caller with the special feature and then access the special features data base associated with dialed number POTS subscriber, rather than vice versa as described in the previous example.

DETAILED DESCRIPTION

Figure 1:
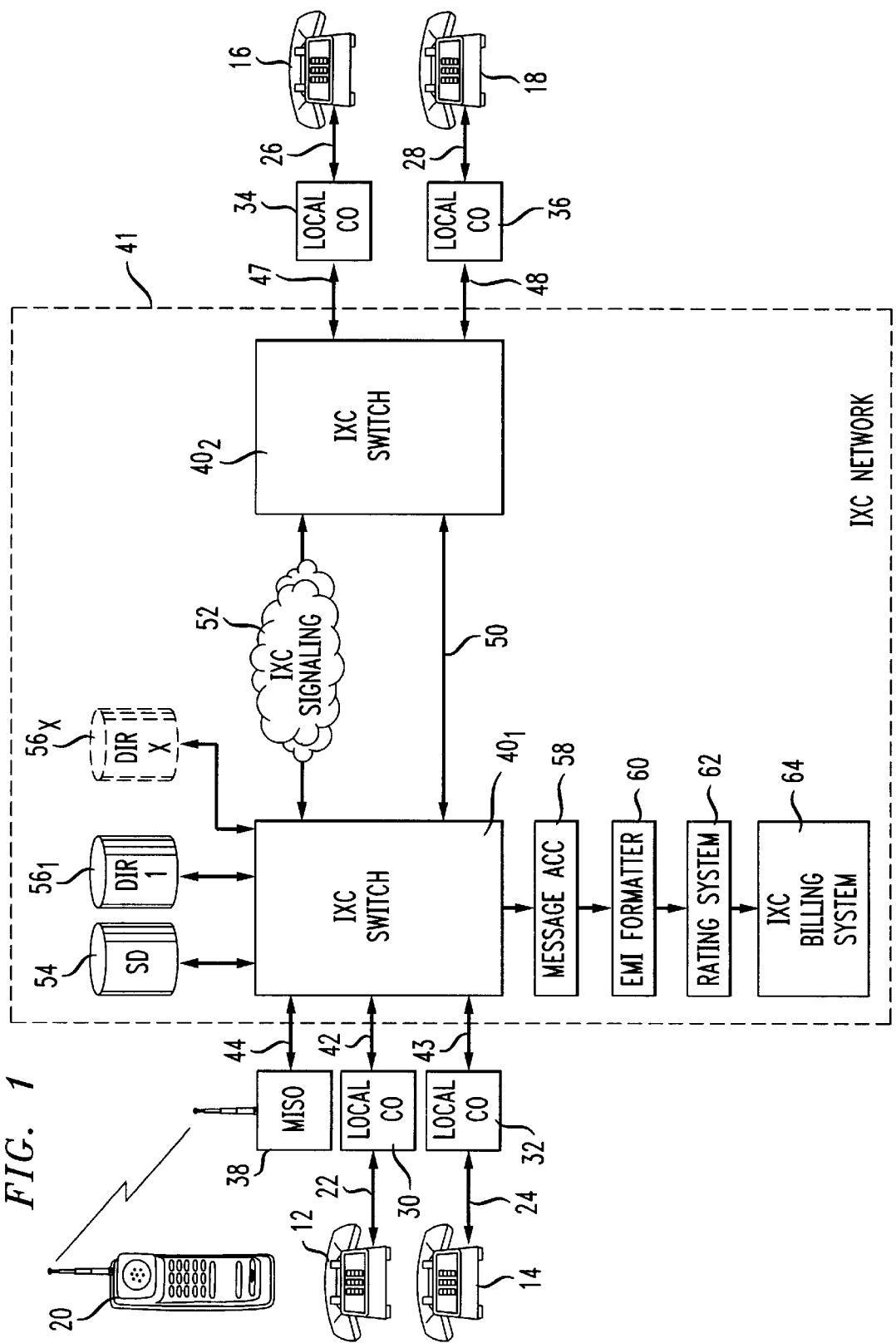
FIG. 1 is a block schematic diagram of a telecommunication network for practicing the present invention.

FIG. 1 illustrates a telecommunication network 10 for providing telephone subscribers (represented by telephone stations 12, 14, 16, 18 and 20) with telecommunications services. In the illustrated embodiment, telephone stations 12, 14, 16, and 18 represent "wired" stations. In other words, individual telephone lines 22, 24, 26, and 28 connect telephone stations 12, 14, 16, and 18, respectively, to central offices 30, 32, 34, and 36, respectively. The central offices 30–36 provide the telephone stations 12–16, respectively, with local service (e.g., dial tone). The lines 22, 24, 26, and 28 connecting the telephone stations 12, 14, 16 and 18, respectively, have distinct telephone numbers to facilitate call routing and to facilitate billing for telecommunications services. Although the telephone stations 12, 14, 16, and 18 are served by central offices 30, 32, 34, and 36, respectively, a single central office could serve more than one telephone station.

In the illustrated embodiment, telephone station 20 comprises a wireless station (e.g., a cellular or personal communications system terminal) served by a Mobile Telephone Switching Office (MTSO) 38. The MTSO 38 effectively provides the station 20 with dial tone. Each wireless telephone station 20 has a unique telephone number for call routing and billing purposes.

To enable the telephone stations 12–20 to originate and receive long distance, as well as special telecommunications services, the central offices 30–36 and the MTSO 38 are served by one of the toll switches $40_1$–$40_n$ within an Inter-Exchange Carrier (IXC) network 41, such as the IXC network maintained by AT&T. In the illustrated embodiment, n=2. To that end, toll switch $40_1$ is linked via trunks 42, 43, and 44 to central offices 30 and 32 and MTSO 38, respectively. Trunks 47 and 48 link central offices 34 and 36, respectively, to toll switch $40_2$. The particular linkage between a central office (or MTSO) and a toll switch within the IXC network 41 depends on the distance between them. Typically, the central offices (and MTSOs) are served by the closest toll switch in the IXC network 41. For ease of discussion the particular one of toll switches $40_1$–$40_n$ that first receives a call is often designated as an "ingress" or "originating" switch. Similarly, the toll switch that delivers the call to its corresponding local central office is referred to as an "egress" or "terminating" switch.

The switches $40_1$ and $40_2$ in the IXC network 41 are linked to each other by at least one voice trunk 50 and by a signaling network 52, such as AT&T's SS7 signaling network. In this way, the switches receive signaling information and can exchange voice (in-band) traffic. (Although not shown, the IXC network 41 may also include one or more via switches for routing in-band traffic between the switches $40_1$ and $40_2$.)

The switch $40_1$ is linked to a data base 54, either directly, or through a signaling or data network such as AT&T's SS7 network. The data base 54, typically referred to as a Segmentation Directory (SD), contains information indicating the identity of at least one special features data base, and in practice, the identity of one of a plurality of several special features data bases $56_1$–$56_x$ (where x is an integer), that should be accessed for specific call processing information. Thus, for example, if the incoming call is an 800 number call, the switch $40_1$ first accesses the SD 54. In response, the SD 54 determines that a particular special features data base, say data base $56_1$, contains information associated with the dialed 800 number. Thereafter, the SD 54 launches a query to the data base $56_1$ which then returns a response to the switch $40_1$ indicating how to process the 800 call. If the call is a 900 number call, the SD 54 determines which special features data base contains the information regarding processing of the dialed 900 number call and then launches an inquiry to that data base which, in turn responds to the switch $40_1$. This process of launching an inquiry from a switch (e.g., switch $40_1$) to the SD 54, and thereafter launching a query from the SD to the appropriate special features data base that, in turn, responds to the switch, is known as triangular signaling. Note that the SD 54 could respond back to the switch $40_1$, which, in turn could directly launch a query to the appropriate one of special features data bases $56_1$–$56_x$ rather than utilize the triangular signaling method previously described.

Although not shown, the other ingress switches in the IXC network 41, such as switch $40_2$, likewise have the capability of accessing the SD 54 (or a copy thereof) upon receipt of an incoming call. Thus, the SD 54 (or the copies thereof) and special features data bases $56_1$–$56_x$ (or the copies thereof) are common to the switches in the network 41, or alternatively, each originating switch may have access to a separate copy of the SD 54 and separate copies of the special features data bases $56_1$–$56_x$. Also, to the extent that the central offices 30–36 and the MTSO 38 are maintained by the same entity that maintains the IXC network, those offices could also access the SD 54 (or a copy thereof) in connection with local service. For a more complete understanding of the nature of the SD, reference should be had to U.S. Pat. No. 5,473,677, issued on Dec. 5, 1995, in the name of Peter D'Amato et al. and assigned to AT&T. (herein incorporated by reference).

In the illustrated embodiment, the ingress switch $40_1$ has been described as possessing the capability of accessing the SD 54. In some instances, the first switch in the IXC network 41 initially receiving a call may lack the capability to access the SD 54. Under such circumstances, a first switch lacking SD access capacity would route the call to a switch having the capability to access the SD 54. The switch having the capacity would access the SD 54 in the same manner as the ingress switch $40_1$.

Each switch in the network 41 receiving incoming calls, such as switch $40_1$, is coupled to a message accumulator 58 that records information about the special feature(s) rendered to the incoming call received at the switch. The information recorded by the message accumulator 58 includes the billing number (typically, the number of the line associated with the telephone station that originated the call), the number of the called party (the number of the line of the telephone station at which the call terminated), the length of the call, and the time at which the call was made. A formatter 60 formats the billing information accumulated by the message accumulator 58 into an industry standard message format. An example of such a message format is disclosed in the aforementioned Rosinski et al. U.S. Pat. No. 5,381,467, incorporated by reference herein.

A rating system 62, typically a data processor or the like, rates the call information, once formatted, to establish a charge for billing purposes. In rating the call, the rating system 62 considers the time of day, the call length, the origin and end points of the call, the applicable rate, as well as any discounts to be applied to the call. An IXC billing system 64 generates a bill rendered to the subscriber in accordance with the charge computed by the rating system 62. Although not shown, the IXC switch $40_2$ also has an associated message accumulator similar to the message accumulator 58. When the switch $40_2$ acts as an ingress switch, the billing information accumulated by the message accumulator associated with the IXC switch $40_2$ is formatted and rated in a manner similar to the billing information from the switch $40_1$ before receipt at the IXC billing system 64.

Prior to the advent of the SD 54, an ingress switch (e.g., switch $40_1$) routing a dialed number call to a terminating end office would, in most instances launch a query to a corresponding one of the special features data bases $56_1$–$56_x$ if the incoming number received at the ingress IXC switch $40_1$ had an associated "special" access code, e.g., a 500, 700, 800, 888 or 900 access code. Conventional calls to an ordinary POTS number (XXX-YYY-ZZZZ) did not trigger an inquiry to one of the special features data bases $56_1$–$56_x$. Under certain circumstances, calls could be routed, based on a dialed DN, to a terminating switch that contained call processing information associated with that DN. However, by routing the call to the terminating switch, the ingress switch could not give precedence to the dialed number based features. Alternatively, call processing data associated with all ten-digit DN's would have to be deployed at every ingress switch, a costly requirement. As a consequence, conventional POTS calls lacking one of the above-described special access codes did not enjoy any special feature (special call treatment) accorded to special access code calls, such as alternate routing, (e.g., geographic or time-of-day routing), toll-free inbound calling, call forwarding, network-based call prompter routing, as well as call load balancing, to name but a few such features. Many POTS subscribers often desire one or more of the special features available with special access codes but do not want to incur the expense of obtaining such an access code and the inconvenience of changing their existing number.

The present invention provides a technique for enabling a POTS subscriber to obtain one or more special features with its existing telephone number by making use of the SD 54. To afford each POTS customer the opportunity to obtain one or more special features independent of the subscriber's numbering plan, the SD 54 contains a record for each dialed number subscriber who has subscribed to special services utilizing the IXC network 41, The SD record identifies the special features data base containing information on how to process a call to provide the special feature subscribed to by the subscriber. (Note that if the same entity maintaining the network 41 also maintains any of local switches 30–36 and the MTSO 38, the SD 54 would also store a record for such subscribers as well.) Table I below exemplifies such a record.

TABLE I

| Number | Directory | Account # | Precedence Index Value |
|---|---|---|---|
| (215) 947-5555 | $56_1$ | XXXXXX | XXXXXX |

Upon receipt at the switch $40_1$ of the dialed number, for example, (215) 947-5555, the switch launches an inquiry to the SD 54, whereupon the SD accesses the record corresponding to the dialed number. After accessing the record, the SD 54 determines whether the call is entitled to special processing, and if so, what data base should be queried to determine how to process the call. If the dialed number has subscribed to a special feature, the SD 54 queries the corresponding special features data base containing the call processing information (e.g., data base $56_1$) for the necessary instructions to process the call. Obviously, each of data base $56_1$–$56_x$, in addition to containing the necessary instructions for processing calls with special access codes (e.g., 500, 800, 888 and 900 numbers) must necessary contain the instructions for those dialed number calls that receive special features in accordance with the invention, including appropriate billing information (including the account number in the SD 54) for billing to the dialed number for providing the special feature.

The ability to provide special features to calls dialed to POTS subscribers without the need for a special access code affords certain advantages, especially in connection with subscribers that maintain telemarketing centers that receive calls via one or more incoming 8YY numbers as well as one or more incoming POTS numbers. Heretofore, subscribers that maintain telemarketing centers with both POTS and 8YY incoming numbers could only obtain special features for calls received via their incoming 8YY numbers. Thus, for example, features such as call forwarding, overflow routing, preferential treatment for selected incoming calls, call prompter routing (including playing of announcements and DTMF digit collection for call routing) and call center load balancing, presently available for 8YY subscribers through AT&T's IXC network, have heretofore not been available in connection with calls dialed to POTS number. However, in accordance with the invention every incoming call, including a call to a POTS dialed number, triggers an inquiry to the SD 54. In this way, the special features described above, as well as other special features, such as call recording (whereby various attributes of each call are recorded) can be offered to subscribers for both 8YY and POTS calls because for each such call, the SD 54 is queried, and accordingly, will query the appropriate special features data base, which, in response, returns the call processing information to the ingress switch. The switch can process the call and provide the requested special feature not withstanding the lack of a special access code. In this way, load balancing based on call counts is more effective, since POTS calls, processed in accordance with the invention, are now counted, allowing a better allocation of both POTS and access code-dialed calls between different call centers. The 8YY dialed call might be offered toll free calling and might share the same routing features as the POTS calls which may not enjoy toll-free treatment and would be billed to the originating caller.

In accordance with another aspect of the invention, the dialed number subscriber may want certain calls, but not others, to enjoy one or more special features depending on the number from which the call originated, as determined by Automatic Number Identification (ANI). To afford such treatment to selected callers, the dialed number subscriber provides the telephone numbers of such selected callers to the network 41, which, in turn, would populate that information to the appropriate one of the special features data bases $56_1$–$56_x$. For example, the special features data base normally handling 8YY call queries (e.g., data base $56_1$) would receive the information containing the list of incoming numbers entitled to toll-free treatment for the dialed number subscriber so that such calls dialed to the corresponding POTS number will receive that special treatment, not withstanding the fact that the dialed number lacks the special access code (e.g., 800, and 888) heretofore required to provide such special call treatment.

In accordance with yet another aspect of the invention, calls dialed to a POTS number are accorded special treatment in accordance with a precedence index value associated with a match between the POTS dialed number and the corresponding number in the SD 54, and a precedence index value associated with a match between the originating number and a corresponding number stored in the SD. In this way, both the dialed number POTS subscriber and the originating subscriber may obtain the special features to which they subscribe. To better understand this aspect of the invention, consider the example where an originating caller that subscribes to one or more Software Defined Network (SDN) special features calls a POTS subscriber that subscribers to a special feature such as alternate routing. Upon receipt of the such a call at the ingress switch $40_1$ of the network 41, the switch launches an inquiry to the SD 54. In response, the SD 54 matches the dialed POTS number to the corresponding stored number and also matches the originating number to the corresponding number to determine what special feature data base should be consulted to afford the originating subscriber and the dialed number subscriber the requested special features.

For each match, the SD 54 establishes a precedence value depending on the features subscribed to by the dialed number and originating number subscribers. Additionally, the SD 54 "arbitrates" the querying of the special features data bases $56_1$–$56_x$ based on the precedence index values. In the above example where an SDN caller calls a POTS subscriber enjoying alternate routing, the comparison between associated precedence index values gives precedence to the DN match because the precedence index value returned for the match of the POTS dialed number would have a higher ranking than the index value returned for the match of the SDN calling party. Consequently, the SD 54 queries the corresponding special features data base associated with the higher ranking precedence index value first, in this case, the special features data base associated with the POTS dialed number. Thereafter, the special features data base (e.g., the one associated with the POTS dialed number) then queries the special features data base associated with the SDN calling party. (Alternatively, the SD 54, or the switch itself could launch the subsequent query.) Depending of the relative precedence index values, the SD 54 may necessary query the special features data base associated with the originating caller to provided the subscribed special feature and thereafter cause a subsequent query to be launched to the special features data base associated with dialed number POTS subscriber, rather than vice versa as described in the previous example.

In connection with the special features offered to both the originating (calling) party and the POTS dialed number subscriber in the manner described, the IXC billing system 64 may optionally create separate billing records for the originating and POTS dialed number subscribers for the special features accorded to each. Alternatively, the billing system 64 may provide separate billing modules for incorporation in separate bills for originating and dialed number subscriber.

Thus far, the present invention has been described primarily in connection with providing special features to POTS dialed numbers in the IXC network 41. However, a network providing local service may readily practice the present invention. To provide special feature processing for POTS dialed numbers, a local originating (ingress) switch (e.g., the switch associated with one of the central offices 30, 32 and MTSO 38) would have access to the SD 54 (or a copy thereof). Thus upon receipt of each incoming call, the local ingress switch would query the SD 54 (or copy thereof) to identify the special features data base, if any, to be queried to provide the special features to the call. Assuming that the local network and IXC are maintained by the same carrier, the local ingress switch could provide the special feature processing by accessing the SD 54 (or copy thereof) and thus would extend the advantage of the special feature availability to a wider number of calls, rather than just to interexchange POTS dialed number calls handled by the IXC network 41.

Additionally, the present invention can also provide special features to calls terminating at a local office, such as one of local offices 34 and 36 of FIG. 1. Just as each of the originating local offices 30 and 32 and MTSO 38 would have access to the SD 54 and special features data bases $56_1$–$56_x$ to provide special features, so too would the local terminating switches associated with terminating offices 34 and 36. Thus, a call delivered to one of the terminating central offices 34 and 36 could receive special feature by providing each of the local terminating switch with access to the SD 54 and the special features data bases $56_1$–$56_x$ (or copies thereof) to enable the local terminating offices to access the SD for each received call. In this way, each local terminating office can provide special features to POTS dialed calls received at such an office. This insures that even calls unable to access the SD 54 from the originating switch (e.g., calls routed to the end office by another carrier) may be afforded services associated with the dialed POTS number.

The above-described embodiments merely illustrate of the principles of the invention. Various modifications and changes may be made thereto by those skilled in the art which will embody the principles of the invention and fall within the spirit and scope thereof.

What is claimed is:

1. A method for enabling each Plain Old Telephone Service (POTS) telecommunications subscriber served by a telecommunications network to enjoy at least one special feature offered by said telecommunication network for a call dialed to said each subscriber without the need for said each subscriber to possess, or require callers to dial, a special access code, comprising the steps of:

receiving at a telecommunications switch in said telecommunication network a non-special access code call dialed to said each POTS telecommunications subscriber;

for each and every non-special access call received at said switch, launching a first query to a first data base containing a record for said each POTS subscriber, and if said subscriber has subscribed to said one special feature, said record including an identity of a second database containing call processing information advising the switch how to process the call to provide said one special feature subscribed to by said each POTS subscriber; and in the event said subscriber has subscribed to said one special feature, then;

launching a second query to said one second data base to receive said call processing information to process said call and provide said one special feature; and returning to said switch from said second data base said call processing information so said switch may process said call and provide said feature.

2. The method according to claim 1 wherein the switch processes the call to provide the special feature only if the call originated from a pre-identified originating number identified by a record in said second data base.

3. The method according to claim 1 including the steps of:

establishing a first precedence index value associated with a match between the dialed number and a corresponding entry in said first data base;

matching an originating number to a corresponding entry in said first data base;

establishing a second precedence index value associated with a match between the originating number and the corresponding entry in said first data base;

determining an order precedence for querying said the plurality of second data bases in accordance with the first and second precedence index values.

4. The method according to claim 1 wherein the special feature is one normally associated with 8YY calls.

5. The method according to claim 1 wherein the special feature comprises alternate routing.

6. The method according to claim 1 wherein the special feature comprises call-forwarding.

7. The method according to claim 1 wherein the special feature comprises load balancing.

8. The method according to claim 1 wherein the incoming call is provided a plurality of special features to which the POTS subscriber has subscribed.

9. Apparatus for enabling each Plain Old Telephone Service (POTS) telecommunications subscriber served by a telecommunications network to enjoy at least one special feature offered by said telecommunication network for each incoming call dialed to said each subscriber without the need for said each subscriber to possess a special access code, comprising:

a telecommunications switch in said telecommunication network for receiving calls dialed to non-special access code numbers of POTS telecommunications subscribers;

a first data base that is queried by the switch for each incoming call received at the switch dialed to a non-special access code number, the first data base containing a record for each POTS subscriber, and if said each subscriber has subscribed to said one special feature, said record including an identity of a second database containing call processing information instructing the switch how to process the call to provide said one special feature subscribed to by said each POTS subscriber; and at least one second data base queried by the switch in response to the first query to the first data base in the event said subscriber has subscribed to said one special feature, said one second data base providing said call processing information related to said dialed number to instruct said switch to process said call and provide said one special feature.

10. The apparatus according to claim 9 wherein said apparatus comprises a plurality of second data bases, each containing call processing information related to separate special features.

11. The apparatus according to claim 9 wherein said one second data base includes a list of pre-selected originating numbers and instructions for processing an incoming call to provide said special feature in accordance with a match between an originating number from which said incoming call originated and one of said preselected originating numbers.

12. The apparatus according to claim 10 wherein the first data base establishes a first precedence index value associated with a match between the dialed number and a corresponding entry in said first data base and second precedence index value in accordance with a match between an originating number and a corresponding entry in said first data base and wherein the first data bases also determining an order precedence of querying said the plurality of second data bases in accordance with the first and second precedence index values.

13. The apparatus according to claim 9 wherein the switch comprises an ingress toll switch within an Inter-Exchange Carrier network.

14. The apparatus according to claim 9 wherein the switch comprises an ingress local switch.

15. The apparatus according to claim 9 wherein the switch comprises a terminating local switch.

* * * * *